United States Patent [19]

Emerick et al.

[11] 3,940,822

[45] Mar. 2, 1976

[54] REAR VIEW SAFETY MIRROR

[75] Inventors: Carl D. Emerick, Cridersville;
Daniel E. Davis, Lima, both of Ohio

[73] Assignee: All Weather Truck Mirror Co., Inc.,
Lima, Ohio

[22] Filed: Feb. 19, 1975

[21] Appl. No.: 551,296

[52] U.S. Cl.......... 15/250.22; 15/250 B; 15/250.19;
310/209; 350/61
[51] Int. Cl.².................................................. B60S 1/44
[58] Field of Search....... 15/250.19, 250.20, 250.22,
15/250 B; 310/209; 350/61, 63

[56] References Cited
UNITED STATES PATENTS

| | | | |
|---|---|---|---|
| 2,464,847 | 3/1949 | Coffey | 310/209 UX |
| 2,670,449 | 2/1954 | Brice | 310/209 |
| 2,722,160 | 11/1955 | Prutzman | 350/61 |
| 2,814,823 | 12/1957 | Werner | 350/61 X |
| 3,135,004 | 6/1964 | Naigraw | 15/250 B |
| 3,153,159 | 10/1964 | Lord | 310/209 X |

FOREIGN PATENTS OR APPLICATIONS 229,252    6/1960    Australia........................... 15/250 B Primary Examiner—Peter Feldman
Attorney, Agent, or Firm—Cushman, Darby & Cushman

[57]    ABSTRACT

A rear view safety mirror is provided with an aperture through the mirror element through which extends a drive shaft for a wiper blade; the drive shaft is connected to the rotary armature of an electric motor which is mounted on the support bracket of the mirror in the rear portion thereof; the armature of the electric motor is mounted so as to be axially movable so that when the motor is supplied with direct current, the armature will shift its position to press the wiper element against the surface of the mirror during rotation thereof; a heating element is also provided in the housing of the mirror to maintain the mirror's surface free of ice and snow during inclement weather.

4 Claims, 3 Drawing Figures

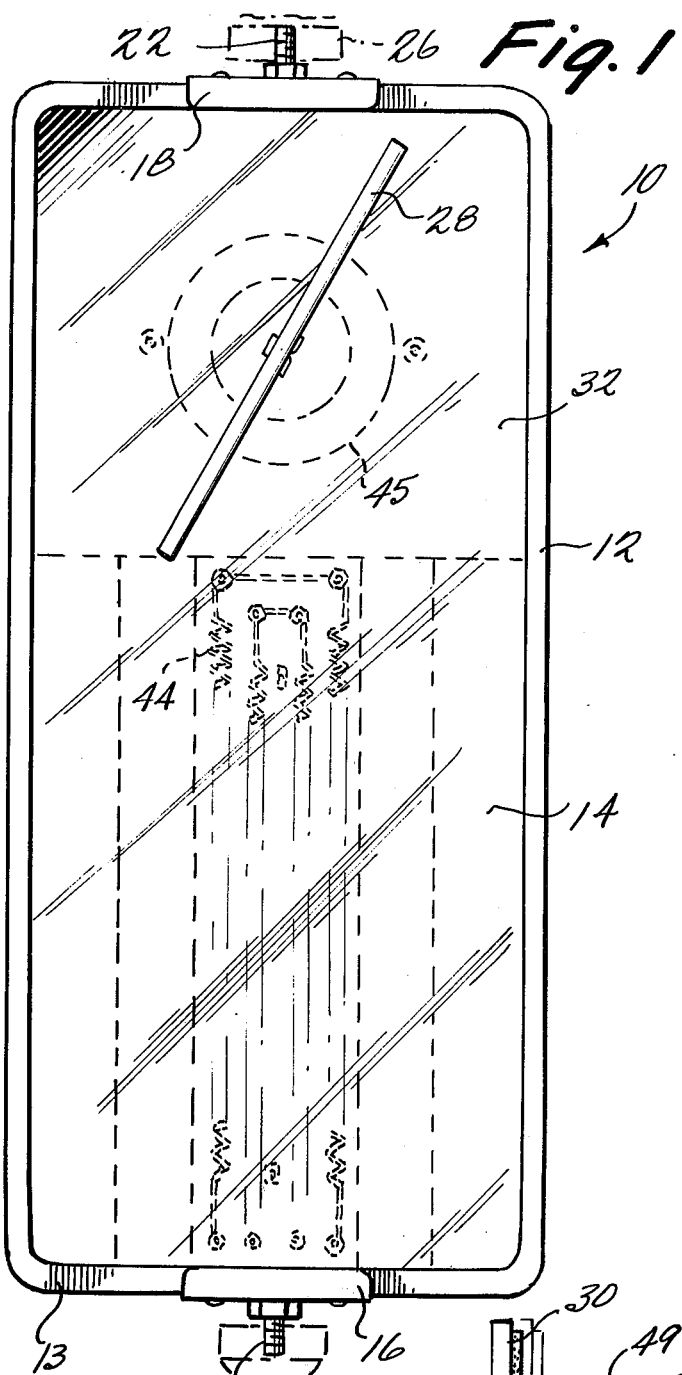
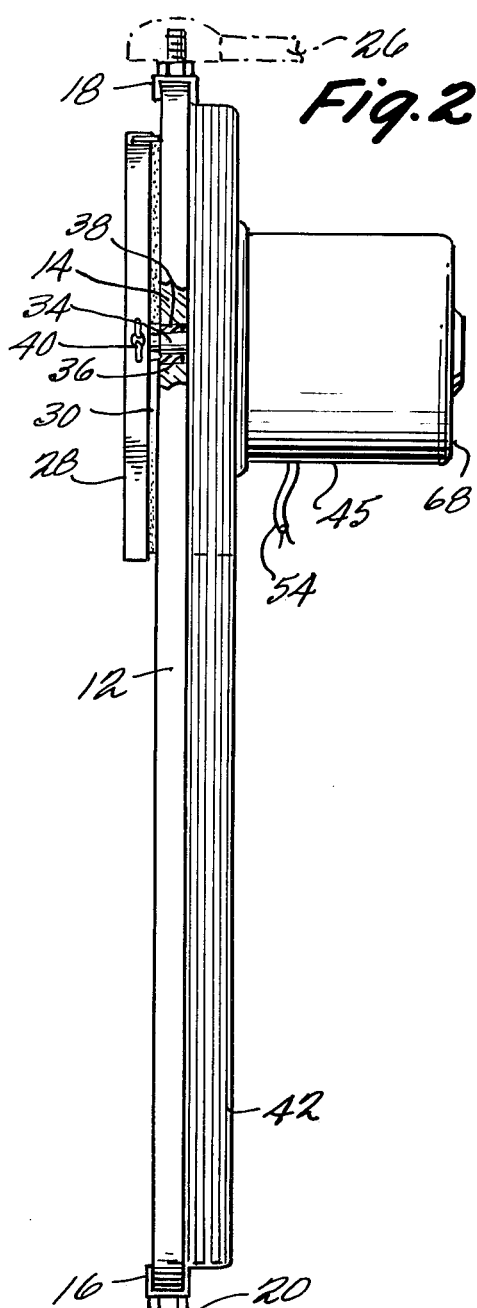
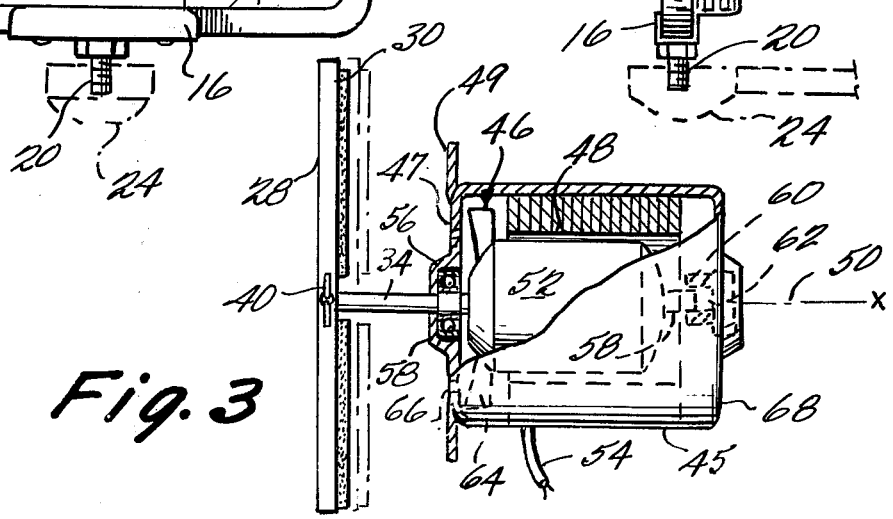

REAR VIEW SAFETY MIRROR

BACKGROUND OF THE INVENTION

The present invention relates to rear view safety mirrors of the type generally used on large truck cabins and, more particularly, to an improved wiper assembly and heating element which are used with such mirrors to maintain them clear during inclement weather.

The standard rear vision mirrors employed on the cabs of trucks and tandem vehicles are generally rectangular in shape and mounted on the side of the cab of a truck with the longer dimension of the mirror generally vertically disposed. Since such mirrors are exposed to the elements, during travel at high speeds due to their large size, considerable air turbulence is generated which contributes to the deposition of water and dirt on the mirrors surface thus obscuring the driver's rear vision.

Since the undesirable safety conditions resulting from the obscuring of a driver's rear and side vision have long been recognized, the prior art has proposed a number of mechanisms, usually in the form of wiping blades, for clearing the mirror element. Some of the proposed arrangements have resorted to employing spring biased wiper arms similar to the arrangements commonly used in conjuntion with the passenger vehicle windshield wipers while others have resorted to employing rather complicated mechanical linkages to attain wiping of the entire mirror surface. These latter arrangements have been found to be very distracting to drivers when not in use during fair weather conditions and have thus often necessitated the provision of additional equipment to enable the wiping mechanism to be stored when not in use thus further increasing the costs of installing such apparatus.

In arrangements where a standard passenger vehicle wiper arm is utilized to clean the mirror's surface, the most expensive portion of the mechanism is the drive linkages since such articles must be specially designed, otherwise a specially constructed drive motor must be employed which, as it turns out, is not a viable economic alternative. As a consequence of the fact that such mechanical linkages must be specially designed for each type of mirror configuration, these linkages will be much more subject to failure as opposed to linkages which can be mass produced for a standardized and well tested operation.

It is an object of the present invention to provide a safety mirror wiper assembly and heating element which can be readily and very inexpensively adapted to accommodate any mirror dimension and satisfactorily effect efficient wiping action over at least a specific desired portion of the mirror and which does not require complicated mechanical linkages. Additionally, the apparatus of the present invention provides a novel means for effecting squeezing action between the wiper blade and reflecting surface of the mirror which is not subject to deterioration over a period of time as are the usual spring linkages that are commonly employed.

SUMMARY OF THE INVENTION

In a preferred embodiment, a specially constructed electric motor having a rotary output is mounted behind the mirror element with the output shaft of the motor extending through an aperture formed in the mirror. A flexible wiper element is attached to a wiper arm which in turn is secured to the end of the motor shaft so that the wiper element contacts the surface of the mirror. The electric motor is of the type that provides a very high speed rotary output so that, when in operation, the wiper blade will not be visible to an observer. In addition, the armature of the electric motor is mounted for axial displacement to a small degree which will occur when the winding of the motor is energized. This will result in a shifting of the armature further into the winding to thus affect a pressing action of the wiper blade on the mirror's surface to ensure firm contact between the wiper element and mirror's surface.

In one embodiment, the heat generated by the electric can be utilized to provide warming air to the casing behind the mirror to maintain the mirror free of ice and fog. In another embodiment, separate electrical coils can be mounted in the casing to furnish heat to the mirror's surface.

By providing a wiper blade that only sweeps a portion of the mirror's surface, the entire wiper blade assembly including the blade, drive shaft and electric motor will occupy only a very small portion of the entire mirror assembly and thus will not interfere in the conventional mounting bracket devices which are employed to permit relatively wide angular adjustment of the mirror to suit the needs of the individual operators of a vehicle.

With the arrangement of the present invention, a very durable yet extremely efficient and economical mirror wiping action can be achieved without requiring the implementation of complicated and expensive mechanical linkages or undue alteration of the conventional or already installed mirror mounting assembly.

Other and further features and advantages of the present invention will be made apparent in the detailed description which follows when considered in conjunction with the accompanying drawings.

BRIEF DESCRIPTION OF THE DRAWINGS

FIG. 1 is a front view in elevation of a rear view mirror and support bracket illustrating the disposition of the wiper blade of the present invention and heating elements;

FIG. 2 is a side view in elevation of the apparatus illustrated in FIG. 1; and,

FIG. 3 is a detailed view of the motor and wiper blade assembly.

DETAILED DESCRIPTION OF THE INVENTION

With reference now to the accompanying drawing, wherein the numerals designate corresponding parts throughout the several views, there is illustrated in FIG. 1, generally designated at 10, a mirror assembly incorporating the features of the present invention. The mirror assembly 10 includes support means in the form of a pair of channeled border frames 12 and 13 which are secured together by joining elements 16 and 18 to enclose a generally rectangular, planar mirror element 14. Also extending from the support means 12 are the usual mounting bolts 20 and 22 which are designed to rotatably engage bracket means in the form of support arms shown in dotted lines at 24 and 26. The support arms 24 and 26, of course, are rigidly secured to the cab of a motor vehicle adjacent the driver's position and, in many circumstances, they are provided next to the passenger position also. It should be understood that other types of brackets and support devices can be employed to secure the mirror element in position adjacent the cab of the vehicle.

In the illustrated embodiment, a wiper arm 28 which carries a resilient, flexible wiper element 30 is located in the upper portion 32 of the mirror element 14. It should be understood, however, that it is intended that the wiper element be located on that portion of the mirror which is approximately at the eye level of the vehicle operator so that the illustrated embodiment should be understood to be by way of example only. However, it is a feature of the present invention that the wiper element be of such dimensions that only a portion of the mirror element is traversed thereby when in operation to thus avoid the necessity of employing complicated mechanical linkages to obtain complete traversal of the mirror element for each sweep of the wiper element as it has been found that for safe operation, clearing of the eye level portion of the mirror element is adequate.

As shown in FIG. 2, the wiper arm 28 is secured to one end of a shaft 34 which extends through an aperture 36 formed in the mirror element 14. The aperture may be provided with cushioning means in the form of a rubber gasket 38. The end of shaft 34 may be secured to the wiper arm 28 by any suitable means such as the illustrated pin 40 which cooperates with a hole (not shown) formed in the end of the shaft 34.

With the reflecting face of the mirror element 14 facing outward as shown in FIG. 1, the rear face (not shown) of the mirror element 14 is enclosed within a casing 42 which is sealingly secured to the frame 12 so as to prevent the intrusion of moisture into the enclosure formed by the casing 42 and the rear face of the mirror. In this enclosure, there are provided coil elements shown in dotted lines at 44 which are mounted on the interior of the casing 42. The coil elements will heat the enclosure and the mirror element 14 when energized by current from the vehicle's battery.

Above the coil elements, on the exterior of the casing 42 is mounted a housing 45 for an electric motor generally designated at 46 in FIG. 3. The housing 45 on its front face 47 is provided with flanges as at 49 which may be bolted or welded to the back of the casing 42 to mount the housing 45 thereon.

The electric motor 46 has a stationary winding consisting of a magnetic core wrapped with conducting wire of the conventional type fixedly carried in the housing 45. The winding 48 is generally circular having a contral axis designated by the line 50 in FIG. 3. The interior of the winding 48 is spaced a distance from the axis 50 to provide space for a rotary armature 52 which consists of a core of magnetic material which is also wrapped with conductive wires. As is conventional, the armature 52 is disposed to rotate about axis 50 when current is introduced as through conductor 54 to the wires of the winding 48 and armature 52. In the type of motor to be used with the arrangement of the present invention, however, the armature 52 is mounted for translational movement parallel to axis 50 as well as rotary movement about the axis 50. To this end, shaft 34 passes through a bearing assembly 56 at end 58 of the housing 45 and is shiftable relative thereto. The other end of the armature 52 is provided with an extension 58 which rests in a bearing member 60. The bearing member 60 is provided with a cylindrical race 62 which permits axial shifting of the armature 52 a predetermined distance to the right as viewed in FIG. 3. When the electric motor 46 is installed in the mirror assembly as illustrated in FIGS. 1 and 2, the armature 52 will normally take the position illustrated in FIG. 3 when the motor 46 is deenergized. However, when current is supplied to the motor 46, the pull of the resulting magnetic field will exert a force on the armature 52 to both rotate the armature about axis 50 and to shift it laterally to the right as viewed in FIG. 3 to an extent limited by the distance between the end of extension 58 and the back wall of the race 62. This shifting will be transmitted through shaft 34 which is rigidly secured in the armature 52 to the wiper arm 28 so that the wiper arm 28 and its associated wiper element 30 will be shifted to the dotted line position illustrated in FIG. 3. Since, in the assembled condition, the reflecting face of the mirror element 14 will be interposed, as illustrated in FIGS. 1 and 2, between the electric motor 46 and the wiper arm assembly, actuation of the electric motor to rotate the wiper arm 28 will also shift the wiper arm 28 to press the wiper element 30 into firm contact with the reflecting face of the mirror element 14. It should be understood that the dotted line position of the armature and shaft 34 corresponding to their shifted positions is omitted for the sake of clarity in FIG. 3.

In practice, the amount of shifting may be very small, for example, on the order of between one-eighth to one-sixteenth of an inch to effect adequate contact between the wiper element 30 and the reflecting face of the mirror element 14.

The power output of the electric motor 46 should be sufficient to provide at least 3,000 revolutions per minute to the wiper arm 28 so that when the motor is actuated the wiper arm will not be visible to the human eye. When current to the electric motor 46 is cut off, pressure of the resilient wiper element 30 will be relieved and the armature 52, shaft 34 and wiper assembly will shift to its rest position as illustrated in FIG. 3 due to the unflexing of the wiper element 30.

It should be understood that the electric motor 46 may be of the conventional two pole direct current type where current is supplied both to the winding and the coils of the armature 52 to provide the necessary power output. To this end, commutator brushes or contacts (not shown) would be employed to provide electric current to the armature as is conventional in these types of motors.

Since electric motors of this type generate heat during their operation, fins may be provided as at 64 to dissipate the heat generated through vents or apertures as at 66 into the interior of the casing 42 to provide warmed air either as an alternative or in addition to that supplied by the coils 44. Of course, the rear wall 68 would also be provided with apertures to permit external air to be drawn in and over the armature and winding to remove heat generated therein.

Having described a preferred embodiment of this invention, it is to be understood that various modifications thereof can be made without departing from the spirit and scope of this invention as defined in the appended claims.

What is claimed is:

1. In a rear view mirror of the type having bracket means for attachment to a vehicle, a planar mirror element, support means movably mounted on said bracket means for supporting said mirror element, said mirror element having a reflecting face and a rear face, the improvement comprising:

said mirror element having an aperture therethrough,
a rotary electric motor mounted on said support means adjacent said rear face, said electric motor having a housing, a field winding fixedly carried in said housing, said winding having a central axis, an armature, means mounting said armature in said housing for rotation about said central axis and movement along said axis between a first and second position with said winding surrounding at least a portion of said armature when said armature is in said second position, a shaft having one end connected to said armature, said shaft extending along said central axis and through said aperture in said mirror element, said shaft having its other end located adjacent said reflecting face of said mirror element, wiper means mounted on said other end of said shaft, said shaft and wiper means being rotatable and movable with said armature from said first toward said second position so that said wiper means will be pressed against said reflecting face of said mirror element, means for delivering electric current to said motor whereby a magnetic field will be established through said winding and armature to cause rotation of said armature and movement thereof from said first toward said second position to press said wiper means against said reflecting face of said mirror element.

2. The invention as claimed in claim 1 wherein said housing for said electric motor is provided with means for distributing heat generated by said motor during the operation thereof to said rear face of said mirror element.

3. The invention as claimed in claim 2 wherein said means for distributing heat generated by said electric motor includes vents formed in said housing for said motor.

4. The invention as claimed in claim 1 wherein said support means includes a casing enclosing said rear face of said mirror element and heating coils are mounted in said casing to heat said mirror element.

* * * * *